A. C. HANSEN.
AUTOMATIC EXHAUST VALVE FOR STEAM ENGINES.
APPLICATION FILED JAN. 8, 1916.

1,228,555.

Patented June 5, 1917.
2 SHEETS—SHEET 1.

Inventor
Axel C. Hansen
By Geo. E. Tew
Attorney

UNITED STATES PATENT OFFICE.

AXEL CONSTANTIN HANSEN, OF NEW YORK, N. Y.

AUTOMATIC EXHAUST-VALVE FOR STEAM-ENGINES.

1,228,555.  Specification of Letters Patent.  Patented June 5, 1917.

Application filed January 8, 1916. Serial No. 70,942.

*To all whom it may concern:*

Be it known that I, AXEL C. HANSEN, a subject of the King of Denmark, residing at New York, in the county of New York and State of New York, have invented certain new and useful Improvements in Automatic Exhaust - Valves for Steam - Engines, of which the following is a specification.

This invention relates to automatic exhaust valves for steam engines of the uniflow type, that is, engines in which exhaust port or ports controlled by the piston are located at the middle of the cylinder, being opened and closed by the piston as it reciprocates.

The invention relates particularly to means for operating auxiliary exhaust valves which control ports located between the ends of the cylinder and the main or middle exhaust port.

The object of the invention is to provide improved means for automatically operating such auxiliary valves, and it is capable of application to either a non-condensing engine, or one which will work either non-condensing or condensing, the latter condition being provided for by a modification including a controlling valve which is governed by the presence or absence of vacuum in the exhaust pipe, and which, when vacuum exists puts the auxiliary valves out of action, and holds them in closed position, the controlling valve being so governed that if the vacuum fails the auxiliary valves are shifted to operative position, and continue to operate while the vacuum is absent. The invention therefore provides an improved automatic control for auxiliary exhaust valves, with a shift from non-condensing to condensing conditions under certain circumstances.

Figure 1:
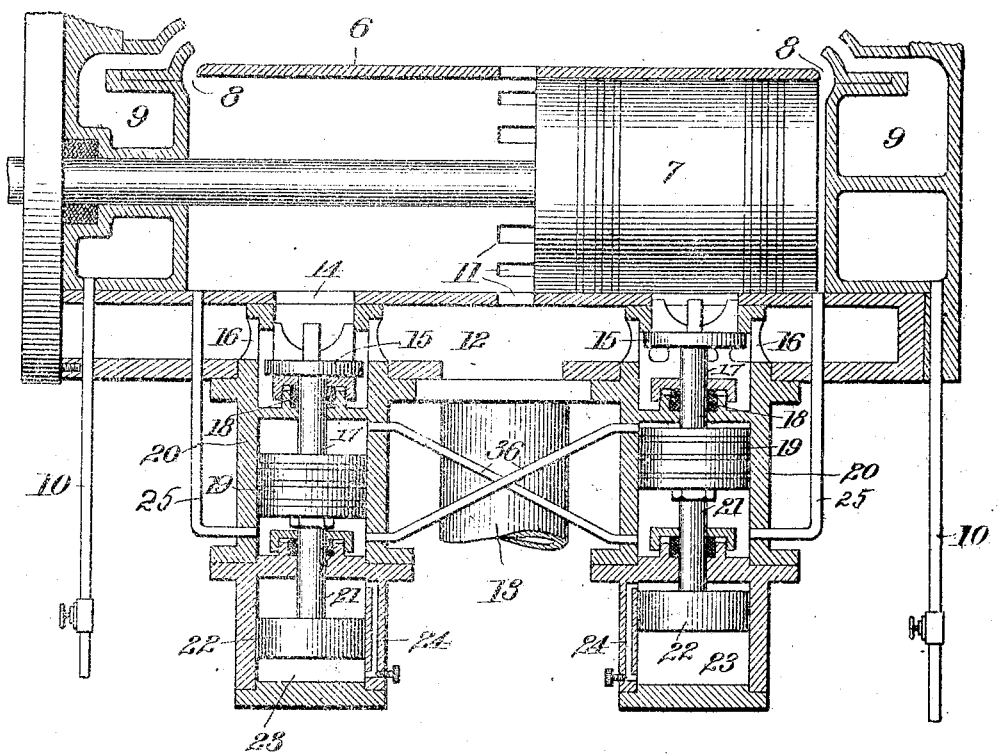
Figure 2:
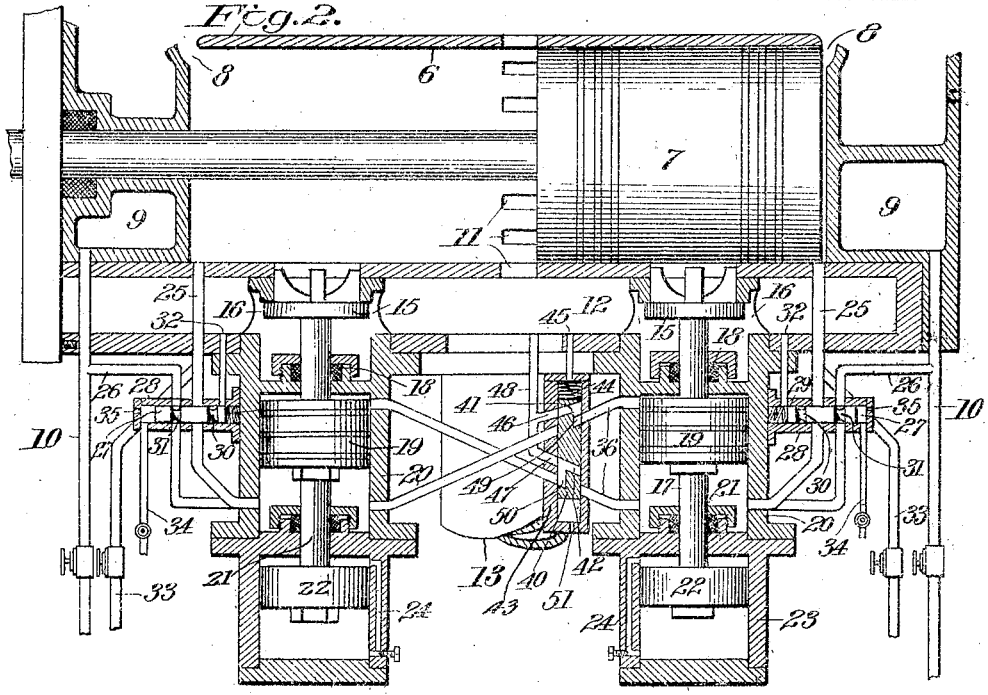
Figure 3:
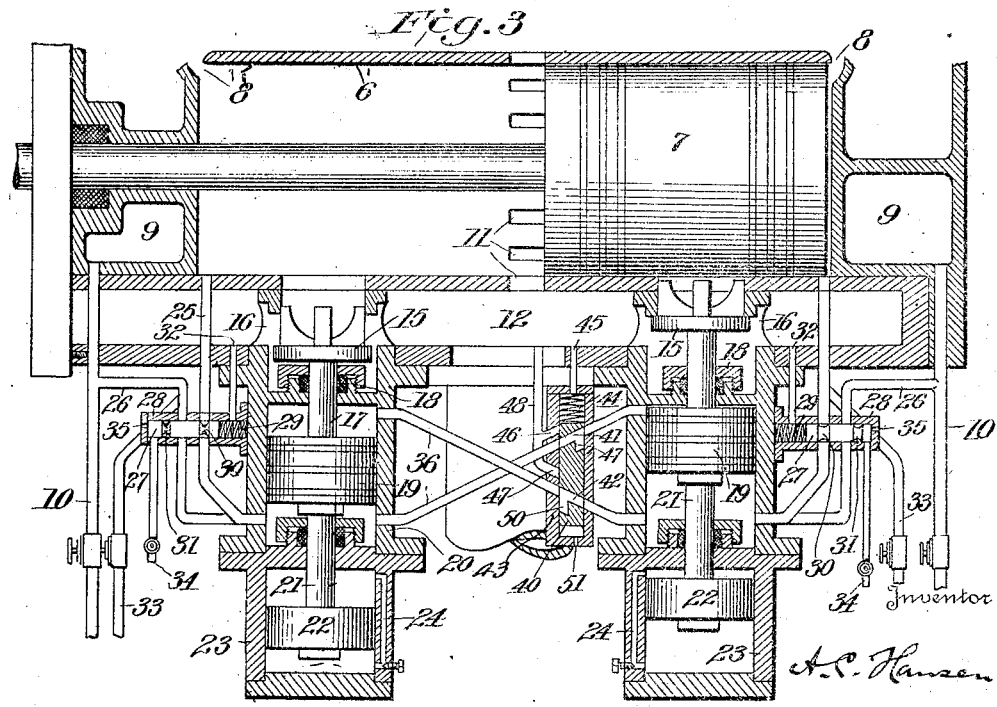

In the accompanying drawings, Figure 1 is a sectional elevation illustrating the invention. Fig. 2 is a similar view of a modification, with both auxiliary valves closed, as when the engine is running condensing. Fig. 3 is a view similar to Fig. 2, but with the valves in operative position, for non-condensing operation.

The engine may be of any suitable type of the uniflow kind. A double acting engine is shown. The cylinder is indicated at 6, its piston at 7, and its inlet ports at 8, the inlet valves being omitted. As shown, the cylinder has hollow steam heated heads 9 which are supplied with steam by a main steam pipe not shown and which communicate with inlet ports in a known manner. Pipes 10 are drain pipes from the heads. The middle exhaust port or ports are shown at 11 communicating with an exhaust chamber 12 extending along the cylinder and with an exhaust pipe 13 which may be connected to a condenser not shown. 14 are the auxiliary ports located in the cylinder wall between the middle exhaust port and the ends of the cylinder. These auxiliary exhaust ports are controlled by valves 15 set in cages 16 in the exhaust chamber, and the stem 17 of each valve works through a gland 18 and is provided with a piston 19 in a cylindrical casing 20. The stem extends through the bottom of the casing as indicated at 21, and carries a piston 22 in a dash pot 23 having a by-pass 24, to cushion the lift and drop of the valve.

A pipe 25 leads from the clearance space at each end of the cylinder to the lower end of each casing 20, and the casing or cylinders 20 are cross connected by pipes 36 each of which leads from the upper end of one casing to the lower end of the other.

Referring now to Fig. 1, and assuming that the engine is working non-condensing, the operation is as follows: Steam being admitted to the head or right-hand end of the cylinder, to drive the piston to the left, the pressure passes through the pipe 25 and casing 20 and lifts the piston 19, thereby closing the valve 15 at that end of the cylinder as shown, and the steam also passes from the said casing 20 through the pipe 36 to the upper end of the left-hand casing 20, thereby forcing down the piston 19 and opening the valve 15 at the exhausting or left-hand end of the main cylinder 6, and as the piston travels to the left, auxiliary exhaust takes place through said valve to the chamber 12 until the piston overruns the left-hand port, the right-hand valve 15, however, remaining closed until the return stroke, so as to not lose expansion until the main ports 11 are uncovered. Meanwhile, the exhaust steam in the upper end of the right-hand casing 20 passes through the other pipe 36 and with the exhaust steam in the lower end of the left-hand casing 20 flows out through the left-hand pipe 25 to the exhaust end of the main cylinder, which as stated is exhausting to the main exhaust pipe. On the return stroke, the reverse operation takes place, the valve 15 at the crank end of the cylinder closing and the opposite valve 15 opening.

For an engine which will operate either condensing or non-condensing, as shown in Figs. 2 and 3, another pipe 26 leads from the pipe 10 to said casing and these pipes are controlled by a reciprocating plug valve 27 contained in a casing 28 conveniently secured to the side of the casing 20. A spring 29 presses against the valve 27 and normally holds the same in such position that the line 25 is open and the line 26 is closed, suitable ports 30 and 31 being provided in said plug valve. When the valve is shifted against the tension of the spring the pipe 25 is closed and the pipe 26 is opened. A pipe 32 connects the exhaust space 12 and the casing 28 on the spring side of the valve 27. The pipe 25 has a valved drain pipe 33 and the casing 28 has a valved drain pipe 34, and said casing also has a small bleeder or air port 35 in the outer end thereof. Also, another valve is provided for controlling the cross passages 36. This comprises a reciprocating plug valve 40 having ports 41 and 42, the valve working in a casing 43, with a spring 44 pressing on the upper end of the valve.

The spring end of the casing is connected by a pipe or passage 45 to the exhaust chamber 12, and the side of the casing 43 has ports 46 and 47 arranged to register with the ports 41 and 42 and connected by a pipe 48 to the exhaust space 12. The ports 41 and 42 have off-sets 49 and 50 adapted to register with the two pipes 36, the valve casing 43 being located across said pipes 36. The lower end of the casing 43 has a small air port 51.

When the engine is running non-condensing, as shown in Fig. 3, the spring 44 presses the valve down and the ports 41 and 42 connect with the pipes 36, the valve 40 remaining idle, and the engine operating as above described. When running condensing the valves 15 must be held closed. When vacuum is drawn in the space 12 the connection through the pipes 32 exhausts pressure from the spring ends of the valves 27, and the air pressure shifts these valves inwardly, compressing the springs, and closing the ports 30 and the pipes 25 and opening the ports 31 and the pipes 26. This lets in steam pressure below both of the pistons 19, thereby lifting said pistons and closing the valves 15. At the same time the exhaust is drawn through the pipe 45 and the controlling valve 40 is lifted by air pressure against the tension of the spring 44, thereby shifting said valve to the position shown in Fig. 2, in which position the cross connections between the casings 20 are closed, the space above the right-hand piston 19 then communicating through the off-set 49, port 41 and pipe 48 with the exhaust chamber 12, and the space above the left-hand piston 19 communicating through the off-set 50, port 42, and pipe 48 with the exhaust space also. Pressure above the pistons 19 is thus relieved while the vacuum exists. If and when the vacuum fails, the springs 29 and 44 act to shift the appropriate valves to original position and the valves 15 take up the original operation or cycle as explained in connection with Fig. 1.

It will be noted that the use of any mechanical valve gear such as cams and eccentric is avoided, the auxiliary valves being operated automatically when running non-condensing and being held closed when running condensing, and the shift from one to the other is automatic, no action on the part of the engineer being necessary.

What I claim is:

1. The combination with a steam engine cylinder of the uniflow type, having an inlet port at each end and a middle exhaust port, of separate auxiliary exhaust valves located between the inlet ports and the middle exhaust port, a piston rigidly connected to each of said valves, means to alternately supply pressure to opposite sides of each piston and exhaust it from the other side respectively, whereby each valve is positively opened and closed, according to the stroke of the engine, said means comprising separate cylinders in which said pistons reciprocate, and cross connecting pipes between both ends of one of the last mentioned cylinders and the relatively opposite ends of the other.

2. The combination with the exhaust valves of a steam engine, of cylinders, pistons therein rigidly connected to the valves respectively, a pressure supply and exhaust pipe connected to each cylinder at one end thereof, and cross connecting pipes between both ends of one cylinder and the relatively opposite ends of the other.

3. The combination with the main cylinder of a steam engine, of independent exhaust valves therefor, a separate pressure operated device rigidly connected to each valve, a pressure supply and exhaust pipe extending from each end of the cylinder to said devices respectively, and means connecting said devices to supply pressure to relatively opposite sides of each device and exhaust pressure from the other sides thereof.

4. The combination with the main cylinder of a steam engine, of exhaust valves therefor, supplementary cylinders, pistons in the supplementary cylinders connected to the valves respectively, pipes connecting the ends of the main cylinder and the supplementary cylinders to admit pressure to the latter or exhaust it therefrom, and pipes cross connecting relatively opposite ends of the supplementary cylinders.

5. The combination with a steam engine cylinder, of an exhaust valve therefor, means to operate said valve when the engine is running non-condensing, and means for holding said valve closed when the engine is running condensing, including a controlling valve governed by variation of pressure in the exhaust pipe.

6. The combination with the exhaust valves of a steam engine, of pressure-actuated means to operate said valves when the engine is running non-condensing, and means for holding said valves closed when the engine is running condensing, including a valve controlling the operation of said pressure-actuated means and governed by the presence or absence of vacuum in the exhaust pipe of the engine.

7. The combination with the exhaust valves of a steam engine, of pressure actuated devices for operating said valves when the engine is running non-condensing, including cross pipe connections between said devices, and means for holding said valves closed when the engine is running condensing, including a controlling valve governed by vacuum in the exhaust pipe of the engine and located in said cross pipe connections to open or close the same.

8. The combination of a steam engine cylinder, a steam pipe thereto, an exhaust valve for the cylinder, a piston connected to said valve, means to supply operating pressure from the cylinder to said piston when the engine is running non-condensing to operate said valve, and means governed by vacuum in the exhaust pipe to cut-off said supply and admit pressure from the steam pipe to said piston when the engine is running condensing, to stop the operation of said valve.

9. The combination of a steam engine cylinder, a steam pipe thereto, an exhaust valve, a piston connected to said valve, a pipe connected to the end of the cylinder and arranged to admit pressure therefrom to said piston, or exhaust pressure therefrom, to operate said valve when the engine is running non-condensing, another pipe connected to the steam pipe and arranged to admit pressure therefrom to the piston, to hold said valve closed when the engine is running condensing, and a valve in said pipes, controlled by vacuum in the exhaust pipe of the engine and adapted to control the admission to the piston of pressure from said pipes respectively.

10. The combination of a steam engine cylinder, exhaust valves therefor, a pressure operated device connected to each valve, cross pipe connections between opposite sides of said devices respectively, a supply and exhaust pipe from each end of the cylinder to each device, a steam supply pipe to each device, valves controlled by vacuum in the exhaust pipe of the engine and governing said pipes and adapted to open and close the same respectively according to whether the engine is running non-condensing or condensing, and another valve controlled by vacuum in the exhaust pipe and governing said cross pipe connections to open or close the same according to the same conditions.

11. In combination with a double acting steam cylinder, an auxiliary exhaust port near each end thereof, valves for closing said exhaust ports, means operated by the pressure of the steam in the cylinder after the piston has overridden one of said ports for closing one valve and opening the other, and means connected with a condenser for automatically permitting said means to close both of said valves.

12. In a double acting steam cylinder provided with auxiliary exhaust ports near its ends, valves for controlling said exhaust ports, means operated by the pressure of the steam in the cylinder after the piston has overridden an exhaust port for actuating said valves to close the last mentioned port and to open the other port, and means connected with a condenser and actuated by reduction of pressure therein for automatically permitting said means to close both of said valves.

13. The combination with a uniflow steam engine cylinder, of auxiliary exhaust valves therefor, a pressure operated device connected to each valve, a pressure supply and exhaust pipe extending from each end of the cylinder to said devices respectively, means connecting said devices to supply pressure to relatively opposite sides of each device and exhaust pressure from the other sides thereof, whereby said valves are alternately opened and closed, and means connected with a condenser and actuated by reduction of pressure therein to automatically supply pressure to the same relative sides of each device and exhaust pressure from the other sides thereof, whereby both valves are held closed.

In testimony whereof, I affix my signature in presence of two witnesses.

AXEL CONSTANTIN HANSEN.

Witnesses:
H. CLANSELEY,
C. SHIRLEY, Jr.